US010379703B2

(12) United States Patent
Steinberg et al.

(10) Patent No.: US 10,379,703 B2
(45) Date of Patent: *Aug. 13, 2019

(54) FILTERING CONTENT IN A SOCIAL NETWORKING SERVICE (71) Applicant: Facebook, Inc., Menlo Park, CA (US)

(72) Inventors: Arieh Steinberg, Seattle, WA (US); Mark Tonkelowitz, Mountain View, CA (US); Peter Deng, Los Altos Hills, CA (US); Adam Mosseri, San Francisco, CA (US); Adam Hupp, San Francisco, CA (US); Aaron Sittig, San Francisco, CA (US); Mark Zuckerberg, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 708 days.

This patent is subject to a terminal disclaimer.

(21) Appl. No.: 14/751,518

(22) Filed: Jun. 26, 2015

(65) Prior Publication Data

US 2015/0301703 A1    Oct. 22, 2015

Related U.S. Application Data (63) Continuation of application No. 12/646,865, filed on Dec. 23, 2009, now Pat. No. 9,110,953.

(Continued)

(51) Int. Cl.
*G06F 3/0481* (2013.01)
*G06F 3/0482* (2013.01)
(Continued)

(52) U.S. Cl.
CPC ........ *G06F 3/0482* (2013.01); *G06F 3/04842* (2013.01); *G06F 16/00* (2019.01); *G06F 16/24573* (2019.01); *G06F 16/287* (2019.01); *G06F 16/955* (2019.01); *H04L 65/403* (2013.01); *H04L 67/06* (2013.01);
(Continued)

(58) Field of Classification Search
CPC .......... G06F 17/3089; G06F 17/30867; H04L 51/32; H04L 12/585; H04L 67/306; H04L 51/12
See application file for complete search history.

(56) References Cited

U.S. PATENT DOCUMENTS

| 2002/0191012 A1 | 12/2002 | Baumeister et al. |
| 2006/0173963 A1 | 8/2006 | Roseway et al. |
| 2006/0173985 A1 | 8/2006 | Moore |

OTHER PUBLICATIONS

United States Office Action, U.S. Appl. No. 12/646,865, dated Aug. 11, 2014, sixteen pages.

(Continued)

*Primary Examiner* — Namitha Pillai
(74) *Attorney, Agent, or Firm* — Fenwick & West LLP (57) ABSTRACT A social networking service presents information about the social network using multiple feeds in a user interface and provides mechanisms for filtering the content. A content feed includes the most recent content generated by the user's connections, and a highlights feed displays content based on importance and relevance. A user may add content to the social networking service through a composer interface. A user may also filter either or both of the content feed and the highlights feed using a filtering interface, which allows selective filtering of the feeds using one or more different types of filters, including as filtering by the source of the content, friends or networks, and/or content type.

20 Claims, 6 Drawing Sheets

Related U.S. Application Data (60) Provisional application No. 61/157,505, filed on Mar. 4, 2009.

(51) Int. Cl.
| | | |
|---|---|---|
| *G06F 16/00* | (2019.01) | |
| *G06F 16/28* | (2019.01) | |
| *G06F 16/955* | (2019.01) | |
| *G06F 16/2457* | (2019.01) | |
| *H04N 21/454* | (2011.01) | |
| *H04N 21/4545* | (2011.01) | |
| *H04N 21/4788* | (2011.01) | |
| *H04L 29/08* | (2006.01) | |
| *G06F 3/0484* | (2013.01) | |
| *H04L 29/06* | (2006.01) | |

(52) U.S. Cl.
CPC ............ *H04L 67/36* (2013.01); *H04N 21/454* (2013.01); *H04N 21/45457* (2013.01); *H04N 21/4788* (2013.01); *H04L 67/306* (2013.01)

(56) References Cited

OTHER PUBLICATIONS

United States Office Action, U.S. Appl. No. 12/646,865, dated Mar. 20, 2014, sixteen pages.
United States Office Action, U.S. Appl. No. 12/646,865, dated Oct. 9, 2013, twelve pages.
United States Office Action, U.S. Appl. No. 12/646,865, dated Jul. 6, 2012, twelve pages.
United States Office Action, U.S. Appl. No. 12/646,865, dated Dec. 23, 2011, nine pages.
PCT International Search Report and Written Opinion, PCT Application No. PCT/US2010/025818, dated Apr. 21, 2010, five pages.

FILTERING CONTENT IN A SOCIAL NETWORKING SERVICE

CROSS REFERENCE TO RELATED APPLICATIONS

This application is a continuation of U.S. patent application Ser. No. 12/646,865, filed Dec. 23, 2009, which claims the benefit of U.S. Provisional Application No. 61/157,505, filed Mar. 4, 2009, each of which is incorporated by reference in its entirety.

BACKGROUND

This invention relates to social networking and, in particular, to a user interface for viewing content in a social networking service.

Social networking services include social utilities that track and enable connections between users (including people, businesses, and other entities), which have become prevalent in recent years. In particular, social networking services allow users to communicate more efficiently information that is relevant to their friends or other connections in the social networking service. Social networking services typically incorporate a system for connecting users to content that is likely to be relevant to each user. For example, users may be grouped according to one or more common attributes in their profiles, such as geographic location, employer, job type, age, music preferences, interests, or other attributes. Users of the social networking service and/or external parties can then use these groups to customize or target information delivery so that information that might be of particular interest to a group can be communicated to that group.

Because of the amount of information presented, a user may easily be overwhelmed when navigating a social networking service. A user may only visit the social networking service sporadically, in which case unviewed, yet relevant, information about other users may be replaced by more recent information. Retrieving the unviewed, missed content is made more difficult because access to a specific type of content (such as photos) by group, network, or friends is not provided.

Social networking services also paradigmatically provide the most recent and relevant information on its users in a news-reporting style. Instead of a conversational tone, social networking services broadcast news stories using a third person tone of voice, such as "Michael is sleeping" or "Phil posted a link to a video." This is problematic because the tone of voice does not encourage users to engage in a conversation, and it may lead to inefficient information delivery because friends who may be talking about the same topics are unaware of each other's existence.

Furthermore, advertisers wishing to use users' affinities, or common attributes, as targeting criteria for advertisements have difficulty placing their ads in contextually relevant areas, a problem called "ad blindness." As a result, users may be inundated with advertisements for products unrelated to the context of what the users are currently viewing. For example, an advertisement about local barber shops may be targeted to a male demographic, but the advertisement lacks contextual relevance when the user is viewing a video about Yoga. Thus, these ads are largely ignored by users of a social networking service.

SUMMARY

To enhance a user's social networking experience, a social networking service presents content related to a social network using one or more feeds in a user interface. A user interface of the social networking service may allow a user to filter the content displayed in the one or more feeds from the social networking service. Beneficially, this may facilitate the user's consumption of what may be a large amount of content provided by the social networking service.

In one embodiment, the user interface includes a filtering interface that allows a user to filter either or both of the feeds based on various criteria. For example, the filtering interface may enable filtering of one or both of the content feed and highlights feed according to attributes of the content items in each of the feeds. The filtering interface may enable filtering by attributes that include, without limitation: source of the content item (i.e., the friend, entity, or application that created the item), network (i.e., a list or group of friends), and content type. In addition to filtering the content feed, the highlights feed, in one embodiment, may also present content based on the same filtering method selected by the user.

The user interface may also include a content feed, which includes the most recent content generated by other users and entities to which the user is connected, and a highlights feed, which displays various types of information based on importance and relevance to the user. With these two different types of feeds, the user interface enables the social networking service to present the most recently updated content to users while, at the same time, presenting the most relevant content to the user at that moment. In this way, the relevance of content is decoupled from the newness of content (i.e., how recent the content was created) that is presented in the user interface.

The user interface may also include a composer interface, which allows a user to add content to the content feed of other users who are connected to the user. The composer interface encourages the user to engage in a conversation with other users by generating content to the content feed via the composer interface, even while the user is passively viewing information about other users in the social networking service. When used in conjunction with the filtering interface, the composer interface may further encourage the user to generate the same type of content being filtered in the content feed and the highlights feed by presenting tools to generate content in accordance with a type of content selected for the filtering. In one embodiment, the content feed, highlights feed, and composer interface may be linked to the filtering interface via the selected filter.

In one embodiment, the highlights feed presents information to the user that is contextually relevant based on the user's attributes, or affinity, and based on the content currently being viewed by the user. For example, if the user has selected a filter for photos and one of the photos presented in the content feed is a photo from an album called "skydiving," the highlights feed may determine the contextual relevance of skydiving (or another extreme sport) and display content based on that contextual relevance. The highlights feed, in one embodiment, may be displayed in the user interface as a user navigates the social networking service. In one embodiment, the highlights feed contains content that is selected in part based on its relevance of the other content contained in the user interface outside of the highlights feed. For example, if a user is viewing a video showing yoga poses, an advertisement about a yoga class may be selected and shown in the highlights feed.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview of Social Networking Service

A social networking service offers its users the ability to communicate and interact with other users of the service. In use, users join the social networking service and then add connections to a number of other users to whom they desire to be connected. As used herein, the term "friend" refers to any other user to whom a user has formed a connection, association, or relationship via the service. Connections may be added explicitly by a user, for example, the user selecting a particular other user to be a friend, or automatically created by the social networking service based on common characteristics of the users (e.g., users who are alumni of the same educational institution). Connections in social networking services are usually in both directions, but need not be, so the terms "user" and "friend" depend on the frame of reference. For example, if Bob and Joe are both users and connected to each other in the service, Bob and Joe, both users, are also each other's friends. The connection between users may be a direct connection; however, some embodiments of a social networking service allow the connection to be indirect via one or more levels of connections. Also, the term friend need not require that users actually be friends in real life, (which would generally be the case when one of the users is a business or other entity); it simply implies a connection in the social networking service.

In addition to interactions with other users, the social networking service provides users with the ability to share content items generated on the service or on an external service or website. These content items may include groups or networks (where "networks" here refer not to physical communication networks, but rather social networking services of people) to which users of the service may belong, events or calendar entries in which a user might be interested, computer-based applications that a user may use via the service to generate content, and transactions that allow users to buy or sell items via the service. These are just a few examples of the items that a user may share on a social networking service, and many others are possible. A social networking service, thus, may be alternatively described as a plurality of interconnected nodes, where nodes refer to the users, entities, and content items existing on the social networking service.

Navigating a social networking service, especially when a user has hundreds, or even thousands of friends, can be daunting due to the sheer amount of information available to the user within these content items. "Content," as used herein, refers also to "content segments" and "content items" in addition to "user-generated content." Actions performed by the other users of the social networking service, including sharing and posting content to a "wall," are visible to the user as "stories" about the actions performed. Content, therefore, includes these stories about actions taken by other users of the social networking service.

Generating content includes uploading songs, videos, photos, and text using computer-based applications that publish the content to the social networking service. The term "user-generated content" also describes this content because users generate the content using the computer-based applications available on the social networking service. Content may be posted to a user's wall by a friend or connection of the user. In addition, a user may post content to the user's own wall. Other types of content, such as GPS applications that provide a user's location coordinates in real-time, as well as games and other third-party applications on the social networking service, may be generated by the user or any authorized user.

Content on a social networking service may further include advertisements from users of the social networking service. Because users of the social networking service also include non-physical entities such as businesses and organizations and because groups of users often generate walls of content as well, the content delivered to a particular user navigating the social networking service must be filtered due to the enormity of information and content being generated by users, or, more generally nodes, of the social networking service.

Delivery of the most relevant information requires algorithms to filter the raw content on the network. Content is filtered based on the attributes in a user's profile, such as geographic location, employer, job type, age, music preferences, interests, or other attributes. "Newsfeed stories" may be generated to deliver the most relevant information to a user based on a ranking of the generated content, filtered by the user's affinity, or attributes. Applying this algorithm, newsfeed stories present the user with the most recent and most relevant content available on the social networking service.

This information delivery approach, while effective in conveying useful information, presents a challenging problem for users of the social networking service. In order to "keep up" with the friends and connections made on the social networking service, a user must regularly visit the social networking service; otherwise, the user would miss relevant information that expires as more recent and relevant information is posted by other users. Thus, this filtering approach does not provide the user access to all of the relevant information on the social networking service because older information, though relevant, is constantly being replaced by newer information. The filtering approach further does not enable the user to manually distill the raw information that is available on the social networking service because the filtering approach relies on the newsfeed generation algorithm described in a related application, "Communicating Information in a Social Networking Website About Activities from Another Domain," Ser. No. 12/193,705 hereby incorporated by reference.

In addition, the newsfeed stories present content in a third party voice, much like a news reporting service. For example, a newsfeed story would state that "Michael posted a video" and include a video application frame through which a user could view the video. Although this vantage point of the social networking service effectively presents the information on the network, the user experience is diminished because a third party voice presents the information in a cold and detached manner. Thus, the newsfeed's third party voice may not encourage a user to take action within a social networking service as much as a more personal tone of voice.

Overview of Filtering the Content Feed and Highlights Feed

Figure 1:
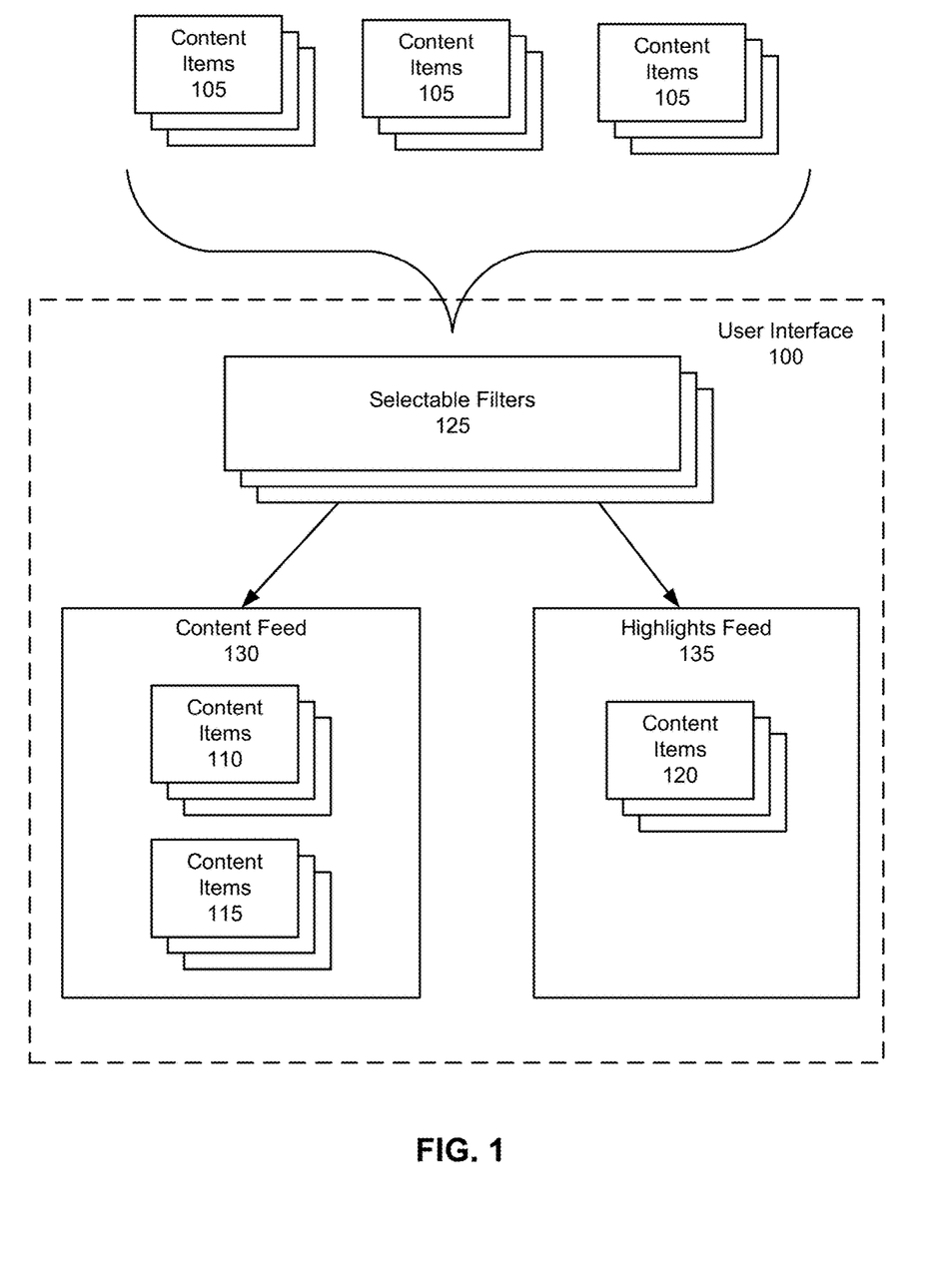
FIG. 1 is a high level conceptual diagram of one embodiment illustrating the filtering of content items into a content feed and a highlights feed.

FIG. 1 depicts a high level conceptual diagram of the invention according to one embodiment. A user interface 100 through which a user may view content generated by other users of a social networking service is illustrated. Content items 105 are received by the user interface 100. Other users in the social networking service generate the content items 105 and a user of the social networking service may subscribe to other users, allowing the subscribing user to view the content items generated by the other users. Being "subscribed" to a particular user, in this context, informs the social networking service of the subscribing user's interest in the particular user's feed of content items. In one embodiment, a user's connections to other users of the social networking service automatically subscribe the user to his or her connected users.

The user interface 100 comprises selectable filters 125, a content feed 130, and a highlights feed 135. A user may select a filter 125 to view a subset of the content items 105 available for display in the user interface 100. Each of the selectable filters 125 specifies a criteria to be applied to the received content items 105.

The filter 125 identifies, of the content items 105 to be displayed, particular content items 110 and 115 that will appear in the content feed 130. The particular content items 110 and 115 are consistent with the criteria specified by the filter 125. In one embodiment, the content items 110 and 115 appear in chronological order in the content feed 130.

Similarly, the filter 125 may also identify, of the content items 105 to be displayed, particular content items 120 that will appear in the highlights feed 135. The particular content items 120 are consistent with the criteria specified by the filter 125. In another embodiment, the content items 120 appear in order of relevancy to the filter 125. In this way, older content items 105 that were received further back in time, but relevant to the filter 125, may be viewed in the user interface 100.

Figure 2:
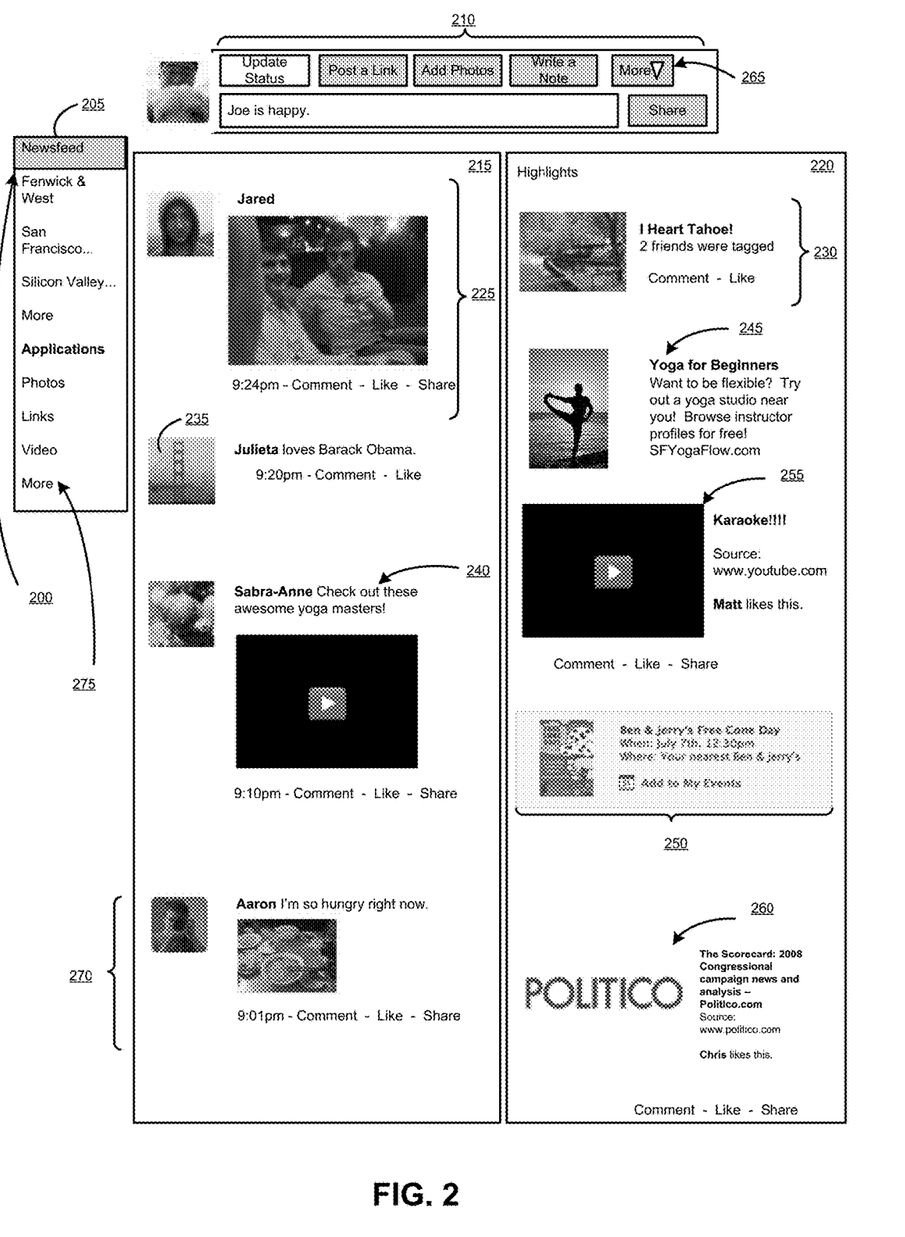
FIG. 2 is a screenshot of one embodiment showing a content feed, a highlights feed, a composer interface, and a filtering interface.

FIG. 2 illustrates a layout of one embodiment of a user interface for a social networking service using a content feed 215 and a highlights feed 220, corresponding to the content feed 130 and highlights feed 135 of the conceptual diagram illustrated in FIG. 1. A filtering interface 205 is displayed to indicate that the interface is set 200 to "Newsfeed," meaning that no filters are turned on. In this embodiment, the filters 205 allow all content from all applications and all networks to be presented. A composer interface 210 is also displayed to enable the user to add, or upload, content to the social networking service. Using the composer interface 210, a user may update his status, post a link, add photos, and write a note. These actions are provided for illustration purposes only as more actions 265 are available to perform via the composer interface 210. Applications are also listed in the filtering interface 205. By selecting one of the applications, a user may filter content by photos, links, and video. The user may also filter by more applications 275 available by selecting "More." A popup window would appear in which the user could select more applications to filter. Thus, content generated by applications can be filtered so that a user can easily view that content.

Content Feed

The content feed 215 presented to the user in FIG. 2 displays the most recently posted content and related actions performed by friends and connections on the social networking service. For example, the content feed 215 shows, in reverse chronological order, that a friend added a new photo 225. Another friend posted a status update 235. Yet another friend uploaded a video 240 related to Yoga. And another friend uploaded a photo 270 about food.

Because no filters have been specified 200 in the filtering interface 205, the content feed 215 displays all types of content available on the network from friends and connections of the user in reverse chronological order. As a result, the content feed is more deterministic because the content displayed in the content feed 215 reflects exactly what content is being posted on the social networking service in real-time.

The content feed 215 is presented in the first person voice. Each content segment identifies the name of the actor, a message by the actor, and is followed by the attached media. For example, a friend named "Jared" added a photo that is shown in content segment 225. Underneath the photo is a timestamp and options to "comment," "like," or "share" the photo. Other actions not listed are also available, such as attaching other types of media content. In the content segment 225, "Jared" did not include a message, but only shared a photo. However, the photo generated by Jared shares non-verbal information with the user viewing the content feed 215. In this way, the content feed 215 encourages a conversational way of content sharing. Instead of reporting passive actions, the content feed delivers content to the user in a first person voice.

The user can engage in a conversation by attaching content to content segments of the content feed 215. As mentioned above, generating content may include text, audio, video, or any other user-generated content that can be uploaded to the social networking service. Alternatively, the user can generate content in the content feed 215 using the composer interface 210.

The content feed 215 is linked to the filtering interface 205 to enable the user to filter the raw content based on various combinations of filters 200. The content feed 215 shows only the qualifying content by applying the filters selected by the user to the raw content. In this way, the user may refine the display of content in the content feed 215 using the filters available on the social networking service.

The content feed 215, in one embodiment, also enables users to follow friends that they want to hear from more regularly and ignore other friends that may share too much information. This feature helps a user who may have large numbers of friends, but who may really want to only interact with a smaller subset of those friends. One option, in one embodiment, is for the social networking service to automatically filter down the list of friends that a user is "following" in the content feed to include only friends for which the user has a high affinity, while excluding friends that the user identifies as sharing too much information in the user's content feed 215. In this context, the term "following" means the act of directing a friend's generated content to be included into a user's content feed 215. A user can follow a friend or another user of the social networking service in a variety of ways, such as by expressly adding the other user to the content stream, or the social networking service may add the other user without an express request based, for example, on actions by the user indicating an interest.

Another option is for the user to manually create "friend lists," or user-defined lists of users to which the user is connected, in order to define the smaller subset of friends that the user wants to view content from in the content feed 215. In this way, a user may manually adjust the friends that she is following to include or exclude friends based on her preferences. For example, if a user has 1000 friends, she probably only interacts with 25 friends on a regular basis. Interactions may include, but are not limited to, clicking on the "like" feature of a friend's posted content, commenting on a friend's posted content, sharing a friend's posted content with the user's other friends, writing on a friend's wall, and using other applications to interact with a friend. Numerous interactions result in a higher affinity for a friend. Thus, for example, the user may initially be following only 25 friends of her friends in the content feed 215 because the social networking service automatically filtered her content feed 215 by affinity for friends. Additionally, she may manually adjust who she is following to include other friends or exclude friends whose content she doesn't want to view by defining groups of friends, or friend lists, to be used by the filtering interface described above. By excluding, or ignoring, these friends, she is not severing the connection in the social networking service, but merely focusing her content feed 215 to only include content from the friends she wants to hear from the most.

Highlights Feed

Also in FIG. 2, a highlights feed 220 presents the most relevant content to the user where the relevancy is based on an affinity score and a decay factor used in the newsfeed generation algorithm described above. The highlights feed 220 displays content, or a preview of the content, generated by users in the social networking service. Content may further comprise stories about actions taken by other users of the social networking service. The highlights feed 220 ranks the content according to the affinity score and the content will expire based on the decay factor. Thus, if a user has a high affinity for photos, videos, and links, more of that type of content will be displayed in the highlights feed 220. Additionally, a user may also want to view the content posted by a selected number of friends, based on the user's personal configuration of these preferences or the newsfeed generation algorithm's determination of these preferences. Thus, although the highlights feed 220 implements the same newsfeed generation algorithm, the highlights feed 220 presents content in a ranked order based on importance/relevance only. Content is presented without regard to its history. As a result, relevant content that may be interesting to a user is shown in the highlights feed 220.

Additionally, the highlights feed 220 may, in an alternative embodiment, include the "following" feature included in the content feed 215, described above. This would limit the display of content that appears in the highlights feed 220 to only the content generated by friends that the user is following.

In FIG. 2, the highlights feed 220 displays a preview of a photo album 230 in which two friends were tagged. An advertisement about yoga is displayed in segment 245. A video that a friend likes is displayed in segment 255. Next, an advertisement 250 about an event giving out a free ice cream cone is displayed with a request to add the event to the user's calendar is displayed. Finally, a link 260 to a news story regarding politics is shown. The display of these segments in the highlights feed 220 does not report that a particular friend posted the content. Rather, the relevance of the content and a preview of the content itself, along with a social aspect of the content (the number of friends that like the content, names of friends who like the content) is displayed. In this way, less information is given, enabling the user to glance over the highlights feed 220 to determine if anything is interesting. Thus, the focus is on the content, not the user who posted the content.

The highlights feed 220 is also distinguishable from the newsfeed because the highlights feed 220 displays contextually relevant content throughout the social networking service by displaying information that is related to what is currently being viewed by the user on the social networking service. For example, in the content feed 215, a status update 235 is displayed. The highlights feed 220 displays the contextually relevant content segment 260 that relates to a link about a political news story 260. User-generated content posted by a friend, such as the link to the news story relating to politics 260, is presented in the highlights feed 220 because it is relevant to the political status update 235 displayed in the content feed 215. Another example of the highlights feed 220 presenting contextually relevant content is, in response to a video 240 uploaded by a friend relating to yoga masters, an advertisement 245 is displayed in the highlights feed 220 that relates to finding a yoga studio in San Francisco (presumably one of the networks which the user has joined). Thus, content with attributes matching the attributes of the currently viewable content will appear in the highlights feed 220.

In addition, the highlights feed 220 sorts content segments based on the overall score on an absolute basis. Content segments may appear in a higher or lower position as they are determined to be more or less interesting. For example, if a photo receives numerous comments, it might climb in ranking. However, once the comments start to expire, meaning that the comments are getting older, the photo would fall downwards in the rankings By decoupling relevant content from time sensitive content, the user interface enables users to view more relevant content that is interesting.

System Architecture

Figure 3:
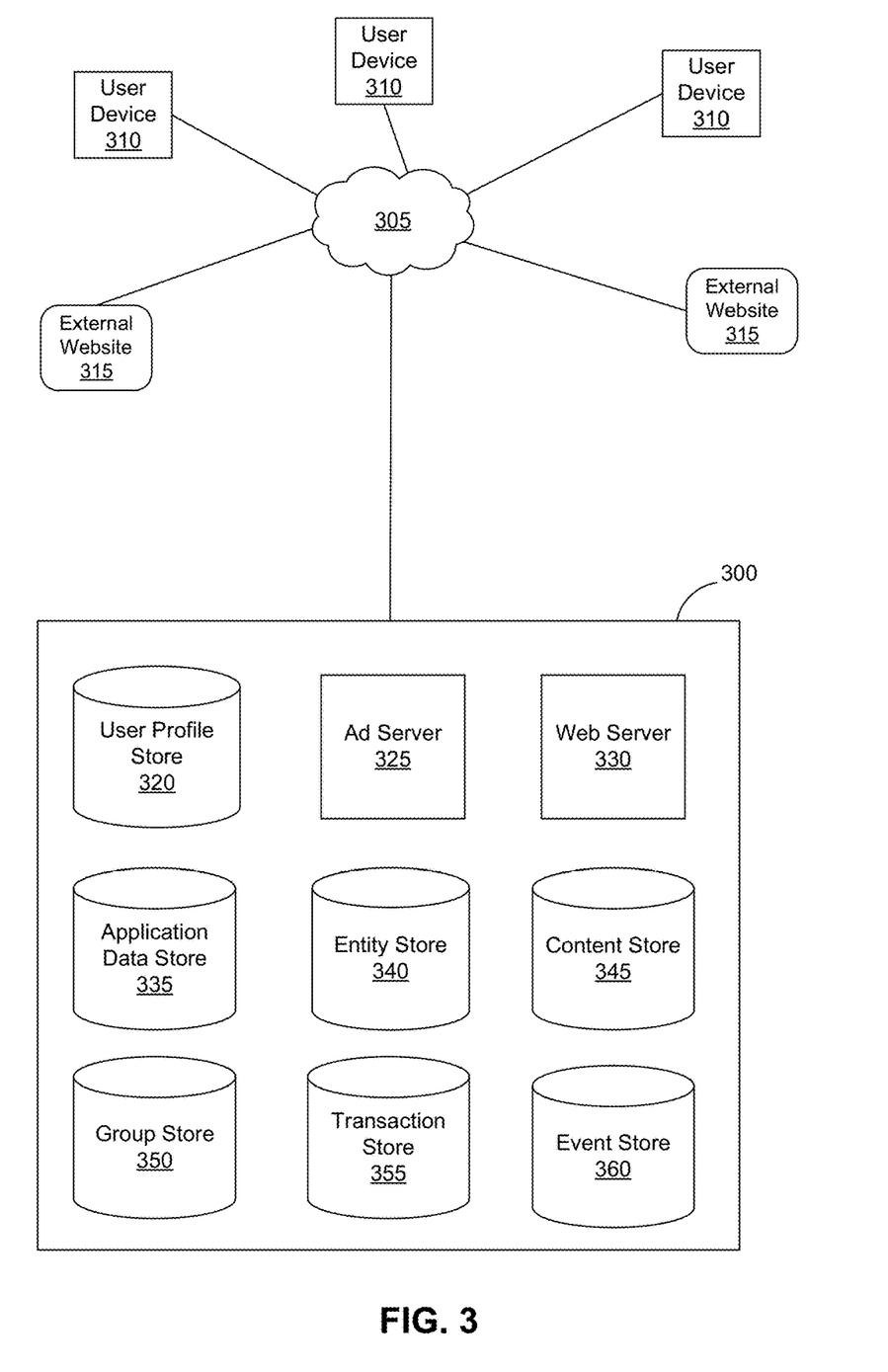
FIG. 3 is a high level block diagram of the system environment and architecture of a social networking service, according to one embodiment.

FIG. 3 is a high level block diagram illustrating a system environment suitable for operation of a social networking service 300. The system environment comprises one or more user devices 310, one or more external websites 315, a social networking service 300, and a network 305. In alternative configurations, different and/or additional modules can be included in the system.

The user devices 310 comprise one or more computing devices that can receive user input and can transmit and receive data via the network 305. For example, the user devices 310 may be desktop computers, laptop computers, smart phones, personal digital assistants (PDAs), or any other device including computing functionality and data communication capabilities. The user devices 310 are configured to communicate via network 305, which may comprise any combination of local area and/or wide area networks, using both wired and wireless communication systems.

FIG. 3 also illustrates a block diagram of the social networking service 300. The social networking service 300 includes a web server 330, an ad server 325, a user profile store 320, an entity store 340, an application data store 335, a transaction store 355, a content store 345, an event store 360, and a group store 350. In other embodiments, the social networking service 300 may include additional, fewer, or different modules for various applications. Conventional components such as network interfaces, security mechanisms, load balancers, failover servers, management and network operations consoles, and the like are not shown so as to not obscure the details of the system.

The social networking service 300 comprises a computing system that allows users to communicate or otherwise interact with each other and access content as described herein. The social networking service 300 stores user profiles that describe the users of a social networking service, including biographic, demographic, and other types of descriptive information, such as work experience, educational history, hobbies or preferences, location, and the like. Additionally, the social networking service 300 includes user-defined connections between different users, allowing users to specify their relationships with other users. For example, these user defined connections allows users to generate relationships with other users that parallel the users' real-life relationships, such as friends, co-workers, partners, and so forth. Users may select from predefined types of relationships, or define their own relationship types as needed.

A user (or other type of node) may have a particular affinity, which may be represented by an affinity score, for another node on a social networking service. In this context, an affinity score indicates the strength of correlation or interest between a user and another node in the social networking service. Affinity scores for a user's connections are stored in the user profile object for that user in the user profile store 320. As indicated above, a node may be a user, entity, or any other object with which a user may engage and interact on a social networking service. Methods for determining affinities between users of a social networking service are described further in U.S. application Ser. No. 11/503,093, filed Aug. 11, 2006, which is hereby incorporated by reference in its entirety.

The social networking service 300 maintains data in a database about a number of different types of objects with which a user may interact on the social networking service 300, including content items, entities, events, applications, groups, and transactions. To this end, each of the user profile store 320, the content store 345, the entity store 340, the event store 360, the application data store 335, the group store 350, and the transaction store 355 stores a data structure in a database to manage the data for each instance of the corresponding type of object maintained by the website 300. The data structures comprise information fields that are suitable for the corresponding type of object. (For example, the event store 360 includes data structures that include the time and location for an event, whereas the user profile store 320 includes data structures with fields suitable for describing a user's profile.) When a new object of a particular type is created, the service 300 initializes a new data structure of the corresponding type, assigns a unique object identifier to it, and begins to add data to the object as needed. This might occur, for example, when a user uploads a new content item, wherein the social networking service 300 would generate a new instance of a content item in the content store 345, assign a unique identifier to the event, and begin to populate the fields of the event with information provided by the user and, subsequently as the content item is posted, by users interacting with the content item.

An ad server 325 generates and delivers advertisements to user devices 310. In one embodiment, an ad server 325 may access the various filters created by users and/or automatically created by the social networking service 300. An analysis of the filters may help advertisers develop better marketing campaigns through more selective targeting techniques utilizing information about users' preferred filters. Targeting advertisements are further described in a related application, U.S. application Ser. No. 12/195,321, filed Aug. 20, 2008, which is hereby incorporated by reference in its entirety.

The web server 330 links the social networking service 300 via the network 305 to one or more user devices 310; the web server 330 serves web pages, as well as other web-related content, such as Java, Flash, XML, and so forth. The web server 330 may include a mail server or other messaging functionality for receiving and routing messages between the social networking service 300 and the user devices 310. The messages can be instant messages, queued messages (e.g., email), text and SMS messages, or any other suitable messaging technique. In another embodiment, the social networking service is implemented on an application running on a user device 310 that accesses information from the social networking service using APIs or other communication mechanisms.

Other Filtering Scenarios

Figure 4:
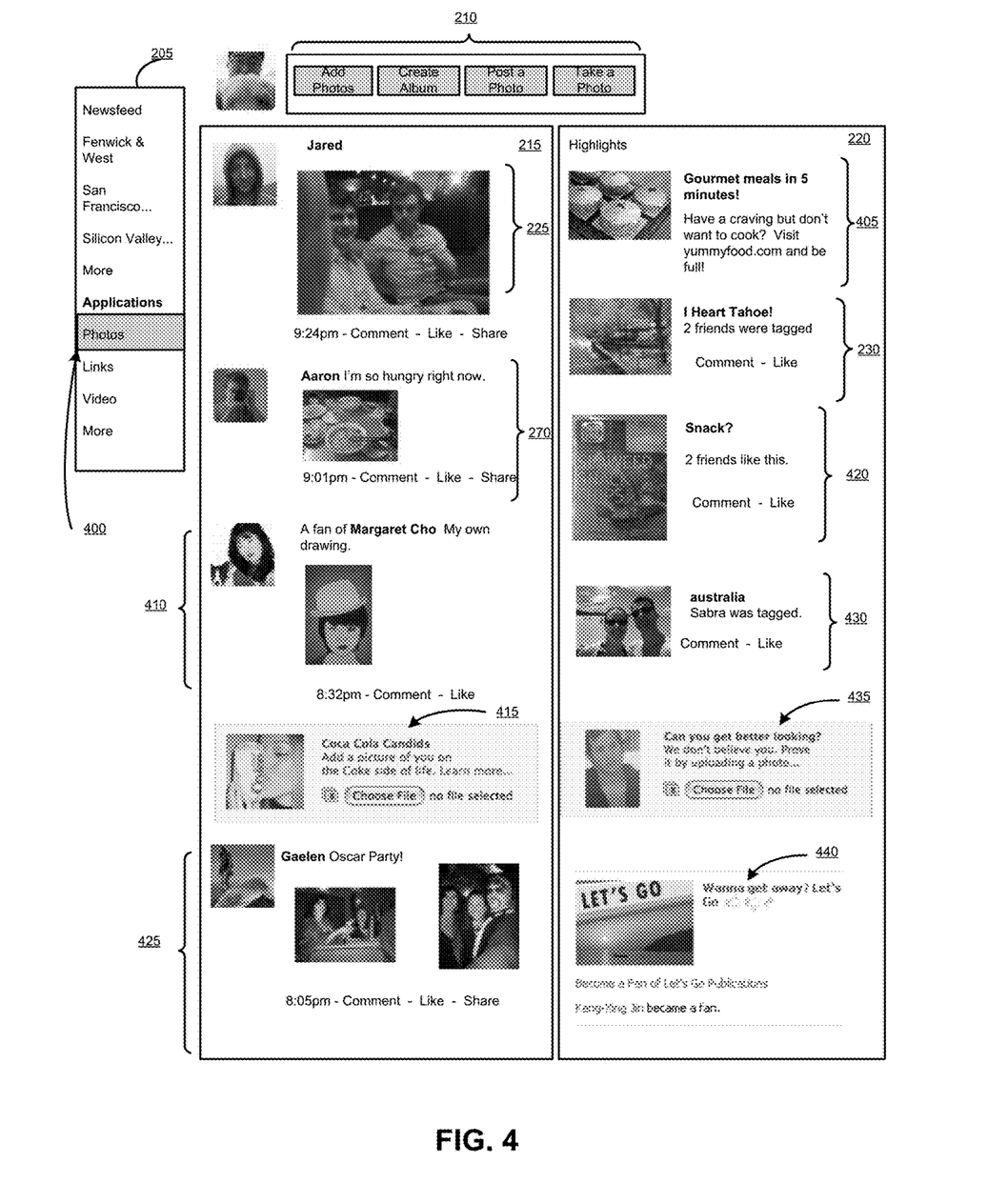
FIG. 4 is another screenshot of one embodiment showing a content feed, a highlights feed, a composer interface, and a filtering interface that filters by photos.

FIG. 4 illustrates the content feed 215 after the user selected 400 a photo filter via the filtering interface 205. The photo filter 400 enables the user to view all user-generated content posted by friends and connections related to photos in reverse chronological order. As shown in FIG. 4, the segments 225 and 270 related to photos in FIG. 2 are displayed in the content feed 215. Further, a fan posted a photo 410 on a fan page that the user is also a fan of, thus qualifying the content to be displayed in the content feed 215. Even though the fan may not be a direct friend or connection to the user, the user's connection to the fan page enables this content to be displayed in the content feed 215. An advertisement 415 that requests the user to upload a photo to the social networking service regarding a promotion is also presented to the user in the content feed 215. Finally, photos uploaded by a friend using a mobile device 425 are also presented to the user via the content feed 215.

Figure 5:
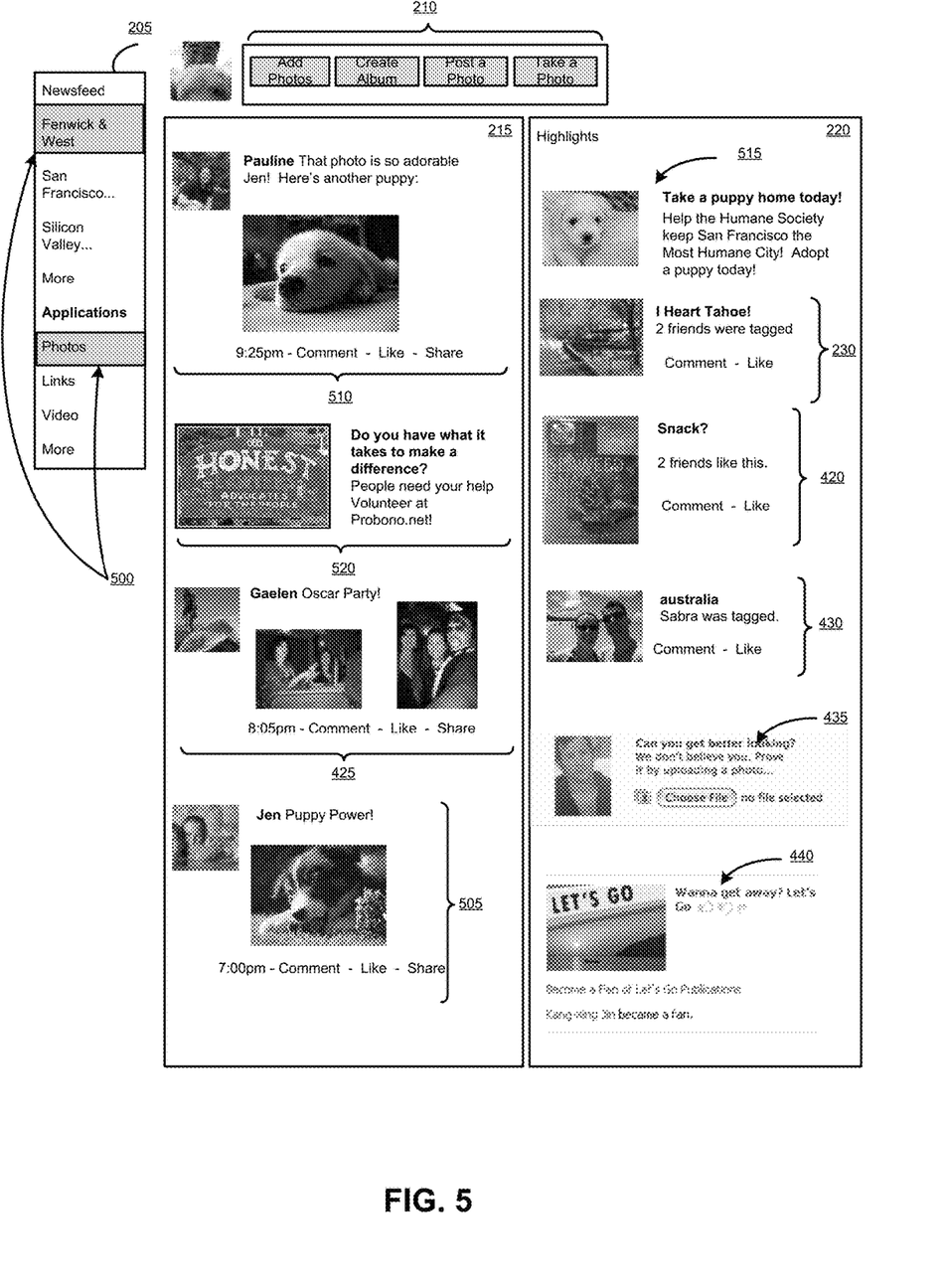
FIG. 5 is a screenshot of another embodiment that filters by photos and by a specified network.
Figure 6:
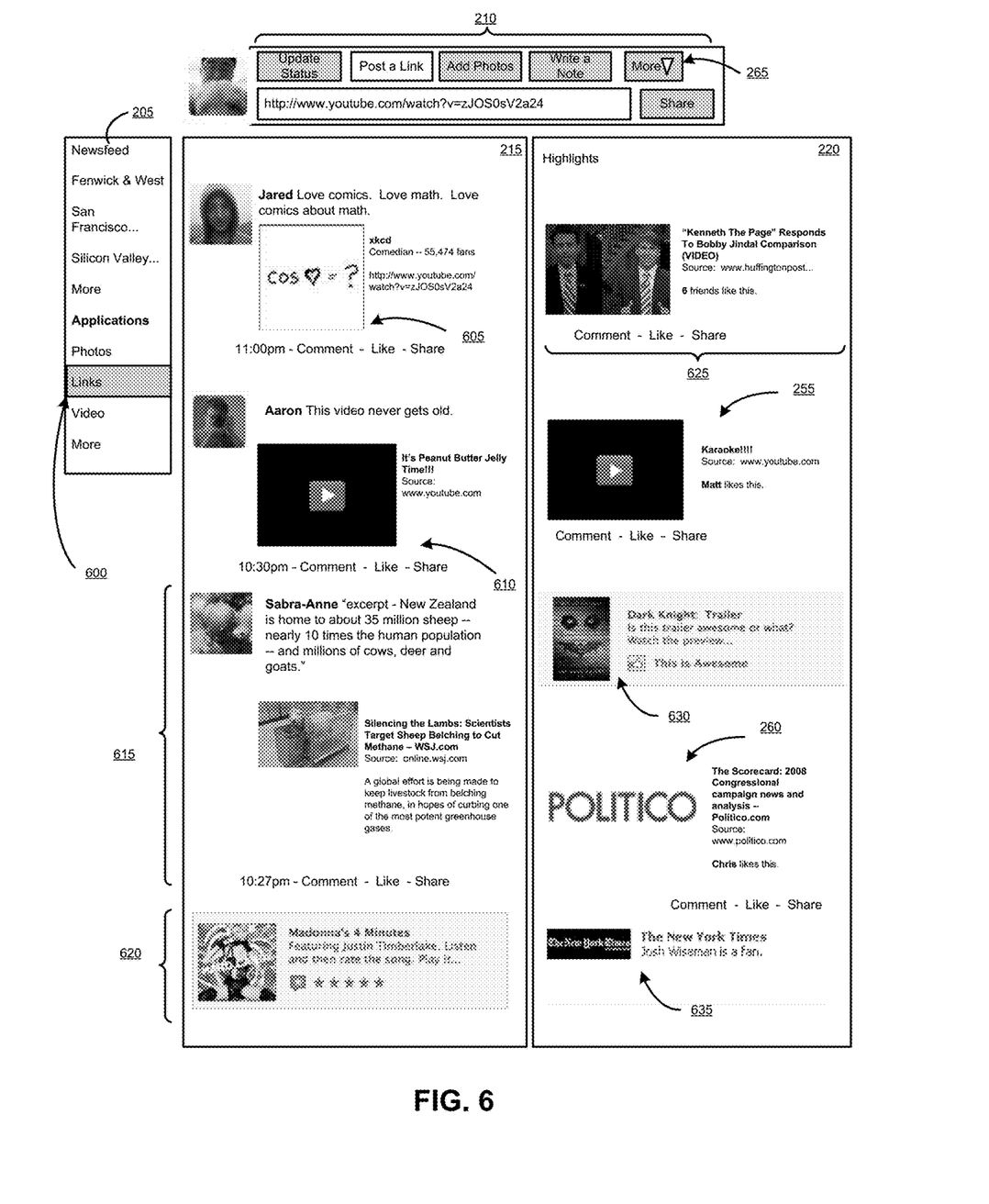
FIG. 6 is a screenshot of another embodiment that filters by links.

FIG. 5 illustrates the content feed 215 after the user, having already selected a photo filter 400 in FIG. 4, selects another filter 500 to filter by network in an alternative embodiment. Older content segment 505 appears near the end of the content feed 215. In this case, a friend initially posted the content segment 505 displaying a photo of a puppy. In response, a friend of the friend responded to the content segment 505 by adding her own photo of another puppy 510. The user may decide to post a photo or generate other content in the content segment 505. Or, he can generate content that is separate from the content segments 505 and 510 by using the composer interface 210 to add content to the content feed 215. Another advertisement 520 is displayed in the content feed 215 that is targeted to lawyers because the selected network filters 500 include a filter by a law firm's network. FIG. 6 similarly depicts a content feed 215 that filters by links and is discussed in more detail below.

The content feed 215 may be filtered by any combination of network, group, application, and by content type while the newsfeed can only be filtered by one method at a time and some filters available to the content feed 215 are not available to the newsfeed. In one embodiment, the content feed 215 may use a filter by friends (i.e., filter by group) or dynamic (i.e., filter by network). Because users determine the networks to which they belong, a filter by network enables a user to filter by a group of friends that does not need to be maintained. Finally, the user may engage in a conversation with other users and friends in the social networking service because content is delivered to the user in the first person voice. By attaching content to posted content in the content feed 215 or adding content via the composer interface 210, a user can easily engage in a conversation with other users of the social networking service in the content feed 215. The conversation may be in the form of text, audio, visual, or any other user-generated content that can be uploaded to the social networking service. In this way, a content-based conversation occurs in the content feed 215.

Returning now to FIG. 4, in which the content filter 400 has been specified to filter for photos, the highlights feed 220 also displays contextually relevant content. For example, the highlights feed presents an advertisement 405 relating to gourmet food delivery in response to a segment in the content feed 215 that displayed a photo 270 relating to hunger. In this embodiment, content in the highlights feed 220 is contextually relevant in that it relates to content in the content feed 215. In this way, advertisers may place advertisement in contextually relevant areas on the social networking service, thus eliminating "ad blindness." In addition, a user can quickly view the posted content of their friends and connections using the highlights feed 220. Thus, the highlights feed 220 displays contextually relevant content, dependent on the shared attributes of the two content items (gourmet food and hunger).

As shown in FIG. 4, the highlights feed presents an advertisement 405 relating to gourmet food to the user. The preview of the photo album 230 remains in the highlights feed 220 from FIG. 2 because the photo album 230 qualified under the selected filter. Next, a photo 420 which 2 friends like is shown in the highlights feed 220. A photo album 430 in which Sabra was tagged is also displayed in the highlights feed 220. Next, an advertisement 435 requesting the user to upload a photo is displayed. Finally another advertisement 440 relating vacations is displayed in the highlights feed 220.

Similarly in FIG. 5, the highlights feed 220 continues to display contextually relevant items. Many of the same segments shown in FIG. 4 are also shown in FIG. 5 because the user selected a filter by network. The segments that are shown in the both FIGS. 4 and 5 are photo content shared by friends in the Fenwick & West network. Additionally, because photo content related to puppies in content segments 505 and 510 is viewable, an advertisement 515 appears in the highlights feed 220 that advertises a local puppy shelter.

The highlights feed 220 is also linked to the filtering interface 205 in the same way as the content feed 215. For example, if the user selected a filter by network, both the highlights feed 220 and the content feed 215 would only display content from friends and connections in the selected network. In this way, the highlights feed 220 presents the most relevant content posted by friends and connections in the selected network. As mentioned above, an advantage of this type of filtering method is that, because users choose to opt-in or opt-out of a network, the network is not managed by a single entity, but rather by the users opting to be in a certain network. Thus, a user can view both the most recent content posted on the social networking service via the content feed 215 and the most relevant content posted on the social networking service via the highlights feed 220 as filtered by a network that is decentralized because membership management of the selected network is performed by the individual users of that network, rather than centrally managed by one entity.

In sum, the highlights feed 220 displays contextually relevant content throughout the social networking service. Content items are not time sensitive and will not expire or be replaced by newer items, but instead are ranked by importance/relevance as determined by the shared attributes of the user's profile and the content items. In addition, the content is featured in the highlights feed 220 surfaces, in one embodiment, due to the social context (such as when multiple friends post the same link to a video). Thus, content is shared based on its relevance based on how popular a content item may be in the social networking service, or by the user's affinity for the content item.

Filtering Interface and Composer Interface

Filtering interface 205 provides the user with options to filter the content in the content feed 215 and the highlights feed 220. Multiple filters can be used to pinpoint the type of content and information that the user wishes to view. FIG. 4 illustrates one filter selected to display only photos. FIG. 5 displays filters 500 that display content related to friends in a specified network as well as limiting the type of content to photos. As a result, the first segment 225 shown in the content feed 215 of FIG. 4 disappears in FIG. 5 because, in this example, Jared is not a user of the Fenwick & West network. The rest of the content that was displayed in the content feed 215 in FIG. 4 shifts up in FIG. 5 allowing older content segment 505 to be displayed. The highlights feed 220 remains basically unchanged from FIG. 4 to FIG. 5 because the friends listed in the highlights feed 220 happen to all be a part of the selected network filter. However, the advertisement 515 now displays an ad about a puppy shelter in response to the older content segment 505 becoming viewable.

The composer interface 210 is also linked to the filtering interface 205. If the user selects a filter by application or by content type, the composer interface 210 displays content generating tools related to the selected application/content filter. If, on the other hand, the user selects a filter by network, the composer interface 210 is not affected because the network filter only relates to grouping of the user's friends, not the content generated by the friends. Thus, the composer interface 210 would display the same content generating tools as in FIG. 4 after a user selects a network filter in FIG. 5.

The filtering interface 205 is also linked to the composer interface 210, as well as the content feed 215 and highlights feed 220. For example, a user might decide to post a link using the composer interface 210. After selecting the "Post a Link" button in the composer interface 210, in one embodiment, the filtering interface may be automatically configured to filter the content feed 215 and the highlights feed 220 to filter by Links, as shown in FIG. 6. By linking the composer interface to the filtering interface in this way, the user can quickly see if one of his friends or connections recently posted the same link to the service in the content feed 215, or if the link showed up in the highlights feed 220 due to its relevance. This linkage between the composer interface 210 and the filtering interface 205 to automatically filter the content feed 215 and highlights feed 220 by content or by application type is not limited to the actions depicted in the figures (update status, post a link, add photos, and write a note) but also includes more actions 265 that are configurable by the user.

OTHER EMBODIMENTS

As shown in FIG. 4, if a user wanted to view the most recent photos uploaded by friends, the user would select a filter 400 to view photos only in the filtering interface 205. The content feed 215 would then present all the photos that have been uploaded recently. Simultaneously, the highlights feed 220 would also display photos which have been determined to be the most relevant to the user based on an affinity score and decay factor, in one embodiment. The composer interface 210 presents the user with ways of uploading content consistent with the selected filter, in this case, a photo content type filter. Thus, the user is provided with ways to the content feed by adding photos, creating a photo album, posting a photo, and even taking a photo with a camera device attached.

FIG. 5 illustrates another filter, one by friends, applied to received content items in content feed in addition to the photo filter in FIG. 4. Thus, a user can specify that only content related to photos generated by friends and connections in the Fenwick & West network should be displayed in the content feed 215 and highlights feed 220.

FIG. 6 illustrates another embodiment of navigating a social networking service using a content feed 215 and a highlights feed 220 in which the filtering interface 205 is configured to show links, which are URLs of external websites that friends and connections on the social networking service have posted. The content feed 215, updated in real time in one embodiment, presents links that have been posted by friends in reverse chronological order. A friend posted a links to a fan page 605. A friend posted a links to a video 610. Another friend posted a links to a news story 615. And finally, an advertiser promotes a new song by placing an ad 620 in the content feed 215. Note that any advertisement can be placed in a content feed in which filters have been configured to display links only because users selecting to view content by links are inclined to clicking on links in rapid succession. Thus, a user might mistake a sponsored ad for a link that was posted by one of his friends. In effect, placement of ads in either the content feed 215 or the highlights feed 220 under these circumstances becomes very valuable to almost any advertiser.

Additionally, although only links are being displayed in the content feed 215 in FIG. 6, the content feed 215 still emulates a conversation because the friend posting the content makes a comment about the link being posted. Thus, regardless of the type of content being displayed in the content feed 215, the structure of each content segment remains in the first person voice.

FIG. 6 also illustrates highlights feed 220 that presents links that are most relevant to the user and links that are contextually relevant to content that is currently being viewed on the page. For example, a link to a blog post 625 that multiple friends have posted is displayed first because it is probably most relevant due to the number of friends that posted the link. Another friend's posted link to a video 255, which is less relevant based on the affinity score and decay factor, is displayed next. An advertisement 630 relating to an upcoming movie is inserted in the highlights feed. Next, another friend's posted link 260 is displayed. A user selecting to filter by links is in the mood to click on interesting headlines that are either most recent (in the content feed 215) or most relevant (in the highlights feed 220). Finally, a link 635 to a fan page, The New York Times, is displayed in the highlights feed 220.

FIG. 6 also shows how easily the user can post a link. Using the composer interface 210, which has been modified to prepare the user to post a link, the user may simply enter a URL into the field and then the user may preview the post before actually posting the link. The preview may appear as a pop-up window that allows the user to comment on the link, thereby creating user-generated content in the form of the user's personal reflection or opinion of the link. As shown throughout the content feed 215, these personal reflections on the links posted simulate a conversational way of sharing content. Alternatively, the user can choose to comment or share any of the posted links that appear in the content feed 215 and highlights feed 220. Thus, both ways of generating links contribute to a conversational way of communicating on the social networking service.

Although filtering content items has been described thus far in the context of web pages of a social networking service, filtering content items into one or more feeds may be implemented using various communication mechanisms, such as mobile APIs, a comment box on external websites, SMS text messaging, notifications, email, among others. As a result, delivery of information to users of a social networking service may comprise multiple communication mechanisms, making the filtering methods described herein very valuable and beneficial to enhancing the user experience of the service.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving content items from authoring users of a social networking service;
   receiving, from the authoring users of the social networking service, user profile attributes comprising descriptive information about each authoring user;
   receiving, from a viewing user of the social networking service, user profile attributes comprising descriptive information about the viewing user;
   automatically creating, by a processor, groups relevant to the viewing user according to one or more rules, the groups comprising the viewing user and one or more of the authoring users of the social networking service, the one or more authoring users having one or more user profile attributes in common with one or more profile attributes of the viewing user;
   providing, to the viewing user, a user interface comprising:
      a content feed that includes a subset of the content items, and
      one or more selectable filters generated by the social networking service for the viewing user, each filter specifying one or more of the automatically created groups of users;
   receiving, from the viewing user, a selection of a filter of the one or more selectable filters, the selected filter associated with at least one group of users; and
   responsive to the selection of the filter, sending for presentation to the viewing user in the user interface an updated subset of content items for the content feed, the updated subset including content items received only from the one or more authoring users in the at least one group of users associated with the selected filter.

2. The method of claim 1, wherein providing the user interface comprises:
   selecting the subset of content items in the content feed according to affinity scores determined between the viewing user and the content items; and
   sending the selected subset of content items for display in the content feed.

3. The method of claim 2, further comprising determining an order for the selected subset of content items based at least in part on the determined affinity scores, the provided user interface organizing the selected subset of content items in the determined order.

4. The method of claim 2, wherein the affinity scores include an affinity score reflecting a strength of interest between the viewing user and one of the content items, the strength of interest determined based at least in part on a previous interaction by the viewing user with a social networking object associated with the one of the content items.

5. The method of claim 4, wherein the social networking object is an authoring user of the social networking service that posted the one of the content items.

6. The method of claim 4, wherein the social networking service object is a content item having a same type as the one of the content items.

7. The method of claim 2, wherein the affinity scores are reduced according to a decay factor that reduces affinity scores according to an age of the content item.

8. The method of claim 1, wherein the one or more selectable filters further comprise a selectable filter that identifies a type of content from the received content items.

9. The method of claim 8, wherein
   the user interface comprises a composer interface that enables the viewing user to upload a plurality of types of content items to the social networking service, and
   in response to selection of a filter specifying a type of content, the composer interface updates to facilitate uploading of the type of content specified by the selected filter.

10. The method of claim 8, wherein the type of content identified by the selectable filter comprises at least one of photos, videos, text updates, hyperlinks, or content from an application within the social networking service.

11. The method of claim 1, wherein the user profile attributes comprise attributes selected from a group consisting of geographic location, employer, job type, age, music preferences, and interests.

12. A computer program product comprising a non-transitory computer-readable medium having instructions encoded thereon that, when executed, cause a processor to perform steps comprising:
   receiving content items from authoring users of a social networking service;
   receiving, from the authoring users of the social networking service, user profile attributes comprising descriptive information about each authoring user;
   receiving, from a viewing user of the social networking service, user profile attributes comprising descriptive information about the viewing user;
   automatically creating, by a processor, groups relevant to the viewing user according to one or more rules, the groups comprising the viewing user and one or more of the authoring users of the social networking service, the one or more authoring users having one or more user profile attributes in common with one or more profile attributes of the viewing user;
   providing, to the viewing user, a user interface comprising:
      a content feed that includes a subset of the content items, and
      one or more selectable filters generated by the social networking service for the viewing user, each filter specifying one or more of the automatically created groups of users;
   receiving, from the viewing user, a selection of a filter of the one or more selectable filters, the selected filter associated with at least one group of users; and
   responsive to the selection of the filter, sending for presentation to the viewing user in the user interface an updated subset of content items for the content feed, the updated subset including content items received only from the one or more authoring users in the at least one group of users associated with the selected filter.

13. The computer program product of claim 12, wherein providing the user interface comprises:

selecting the subset of content items in the content feed according to affinity scores determined between the viewing user and the content items; and sending the selected subset of content items for display in the content feed.

14. The computer program product of claim 13, further comprising determining an order for the selected subset of content items based at least in part on the determined affinity scores, the provided user interface organizing the selected subset of content items in the determined order.

15. The computer program product of claim 13, wherein the affinity scores include an affinity score reflecting a strength of interest between the viewing user and one of the content items, the strength of interest determined based at least in part on a previous interaction by the viewing user with a social networking object associated with the one of the content items.

16. The computer program product of claim 12, wherein the one or more selectable filters further comprise a selectable filter that identifies a type of content from the received content items.

17. The computer program product of claim 16, wherein the user interface comprises a composer interface that
    enables the viewing user to upload a plurality of types of content items content items to the social networking service, and
    in response to selection of a filter specifying a type of content, the composer interface updates to facilitate uploading of the type of content specified by the selected filter.

18. A system comprising:
a processor; and
a computer program product comprising a non-transitory computer-readable medium having instructions encoded thereon that, when executed, cause the processor to perform steps comprising:
receiving content items from authoring users of a social networking service;
receiving, from the authoring users of the social networking service, user profile attributes comprising descriptive information about each authoring user;
receiving, from a viewing user of the social networking service, user profile attributes comprising descriptive information about the viewing user;
automatically creating, by a processor, groups relevant to the viewing user according to one or more rules, the groups comprising the viewing user and one or more of the authoring users of the social networking service, the one or more authoring users having one or more user profile attributes in common with one or more profile attributes of the viewing user;
providing, to the viewing user, a user interface comprising:
    a content feed that includes a subset of the content items, and
    one or more selectable filters generated by the social networking service for the viewing user, each filter specifying one or more of the automatically created groups of users;
receiving, from the viewing user, a selection of a filter of the one or more selectable filters, the selected filter associated with at least one group of users; and
responsive to the selection of the filter, sending for presentation to the viewing user in the user interface an updated subset of content items for the content feed, the updated subset including content items received only from the one or more authoring users in the at least one group of users associated with the selected filter.

19. The system of claim 18, wherein providing the user interface comprises:
selecting the subset of content items in the content feed according to affinity scores determined between the viewing user and the content items; and
sending the selected subset of content items for display in the content feed.

20. The system of claim 18, wherein,
the one or more selectable filters further comprise a selectable filter that identifies a type of content from the received content items,
the user interface comprises a composer interface that enables the viewing user to upload a plurality of types of content items content items to the social networking service, and
in response to selection of a filter specifying a type of content, the composer interface updates to facilitate uploading of the type of content specified by the selected filter.

* * * * *

UNITED STATES PATENT AND TRADEMARK OFFICE
CERTIFICATE OF CORRECTION

PATENT NO. : 10,379,703 B2
APPLICATION NO. : 14/751518
DATED : August 13, 2019
INVENTOR(S) : Arieh Steinberg et al.

Page 1 of 1

It is certified that error appears in the above-identified patent and that said Letters Patent is hereby corrected as shown below:

In the Claims

Column 17, Line 25, Claim 17, delete "types of content items content items to the social networking" and insert -- types of content items to the social networking --.

Column 18, Line 38, Claim 20, delete "types of content items content items to the social networking" and insert -- types of content items to the social networking --.

Signed and Sealed this
Twenty-fourth Day of December, 2019

Andrei Iancu
*Director of the United States Patent and Trademark Office*